United States Patent
Hillier

[15] 3,651,602
[45] Mar. 28, 1972

[54] DRILL GRINDING MACHINE

[72] Inventor: Elmer W. Hillier, Swartz Creek, Mich.

[73] Assignee: Hillier-Thomas Corporation, Swartz Creek, Mich.

[22] Filed: Oct. 19, 1970

[21] Appl. No.: 81,649

[52] U.S. Cl. .................................................. 51/96, 51/234
[51] Int. Cl. ................................... B24b 9/00, B24b 47/02
[58] Field of Search ..................... 51/96, 46, 94, 164, 234

[56] References Cited

UNITED STATES PATENTS

| 2,524,279 | 10/1950 | Van Wyk | 51/96 |
| 2,827,741 | 3/1958 | Hillier | 51/96 |
| 3,397,492 | 8/1968 | Wilson | 51/96 |

Primary Examiner—Othell M. Simpson
Attorney—Beaman & Beaman

[57] ABSTRACT

A simplified drill grinding machine capable of enabling unskilled persons to be quickly trained for high-production hand sharpening of drills, end mills, and the like, in which the indexing of the drill and the rate and degree of grinding thereof is manually provided and controlled while, at the same time, mechanical positioning and "feel" is provided for carrying out the grinding operation.

8 Claims, 11 Drawing Figures

Patented March 28, 1972

INVENTOR
ELMER W. HILLIER

BY Beaman & Beaman

ATTORNEYS

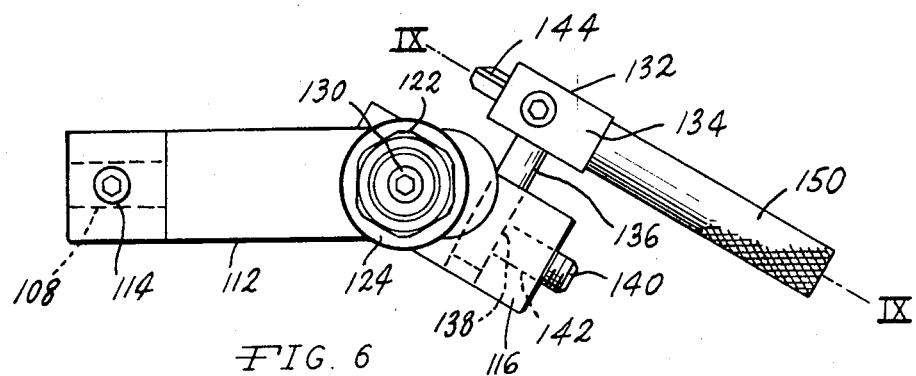
FIG. 6
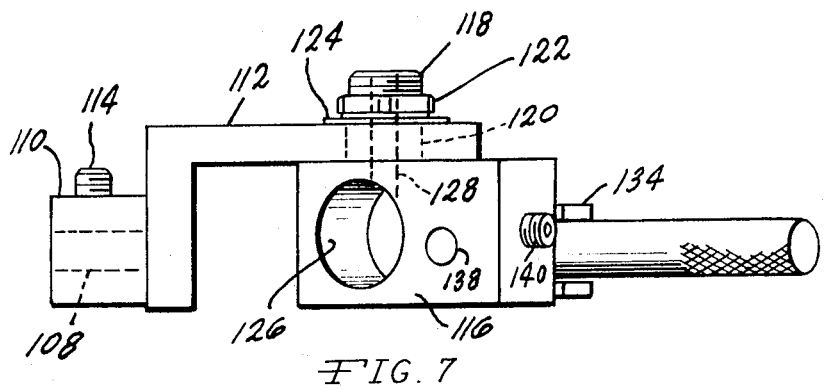
FIG. 7
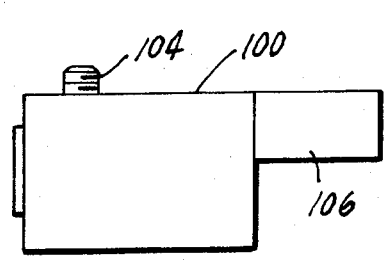
FIG. 8
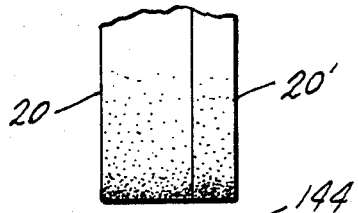
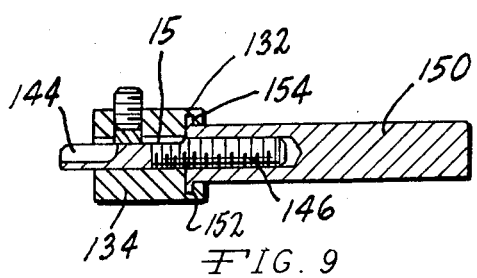
FIG. 9
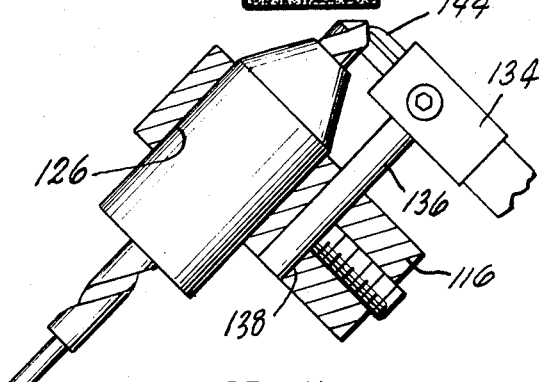
FIG. 11
INVENTOR
ELMER W. HILLIER
BY Beaman & Beaman
ATTORNEYS

DRILL GRINDING MACHINE

BACKGROUND OF THE INVENTION

Production as well as tool room drills, end mills, and the like, require frequent and accurate repointing, refacing, split pointing, web thinning and similar operations performed thereon. In connection with the maintenance of high-production machine tools employing large numbers of drills, mills, and the like, it is desirable that sharpening operations be capable of being carried out by unskilled persons at a rate of several hundred tools per hour per person.

Apparatus for the automatic sharpening of new drills are well known, as is apparatus for repointing drills in which each drill as repointed is mechanically chucked and manipulated with great but time-consuming precision. The present invention departs from such apparatus and constitutes an improvement over more simplified forms of grinding machines as disclosed in U.S. Pat. No. 2,827,741 of which the present applicant is a copatentee.

NATURE OF THE PRESENT INVENTION

The offhand grinding of a drill is a matter involving good vision, a great deal of experience and a particular "feel" on the part of the operator for the operation being carried out. Through the use of steady rests and other accessories associated with tool room grinding wheels, a fair degree of accuracy is capable of being obtained by hand grinding, provided it is carried out by skilled operators.

In carrying out the present invention the advantages of hand grinding have been retained, namely, manual holding or chucking, feeding and indexing of the drill. To have accuracy the present invention has mechanically provided, in a simple and inexpensive manner, positioning and sensing means enabling unskilled operators, after a brief training period, to repoint 200–400 drills per hour.

To a substantial degree, the rate of material removal by a grinding wheel may be determined by observing the sparking of the wheel and by experiencing the resistance or "feel" of the grinding wheel against the tool being sharpened. Also, when dull, broken and nicked drills are being sharpened, it is desirable to inspect the drill during the grinding operation to avoid unnecessary removal of material. In carrying out the essence of the present invention both visual and audible indications of the grinding operation, together with the "feel" or resistance thereof are coordinated in combination with the operator with simple mechanical aids which enable the unskilled persons to, in effect, hand sharpen reusable tools rapidly and accurately.

One of the aids mentioned above takes the form of a stop finger for the tool to be ground which is capable of a slight movement toward the grinding wheel effected by manual pressure exerted on the shank of the tool in excess of that pressure required to carry out the final portion of the grinding cycle. In this manner, the rate of grinding is manually controlled in the presence of an operational "feel" built into the apparatus in the form of an adjustable reaction which may take the form of spring pressure. This "feel" reacting against the operator through the shank of the tool assures equal lip height being obtained at the conclusion of the sharpening operation.

Another of the aforesaid aids takes the form of an improved holder and stop in which the drill, or the like, is manually held by one hand while being swung through an arcuate path by the other hand to cause the end of the drill being ground to have a "sweep through" engagement with the grinding wheel.

A further aid to high production drill grinding is provided through the provision of a simple setup procedure coupled with convenient wheel-dressing means, the wheel being so dressed that grinding may take place axially along the peripheral portion of the grinding wheel without resetup by moving the drill holder along a path parallel to the axis of rotation of the wheel.

BRIEF DESCRIPTION OF THE DRAWINGS

The aforementioned objects and advantages of the invention will be apparent from the following description and accompanying drawings wherein:

FIG. 8 is a side elevational view of the eccentric coupling for the drill holder shown disassembled from its associated structure, FIG. 9 is a cross-sectional view taken on line IX–IX of FIG. 6, FIG. 10 is a view of the wheel dresser, and FIG. 11 is a diagrammatic view of the association between the working end of the drill, the stop finger and the grinding wheel.

DESCRIPTION OF THE PREFERRED EMBODIMENT

Figure 1:
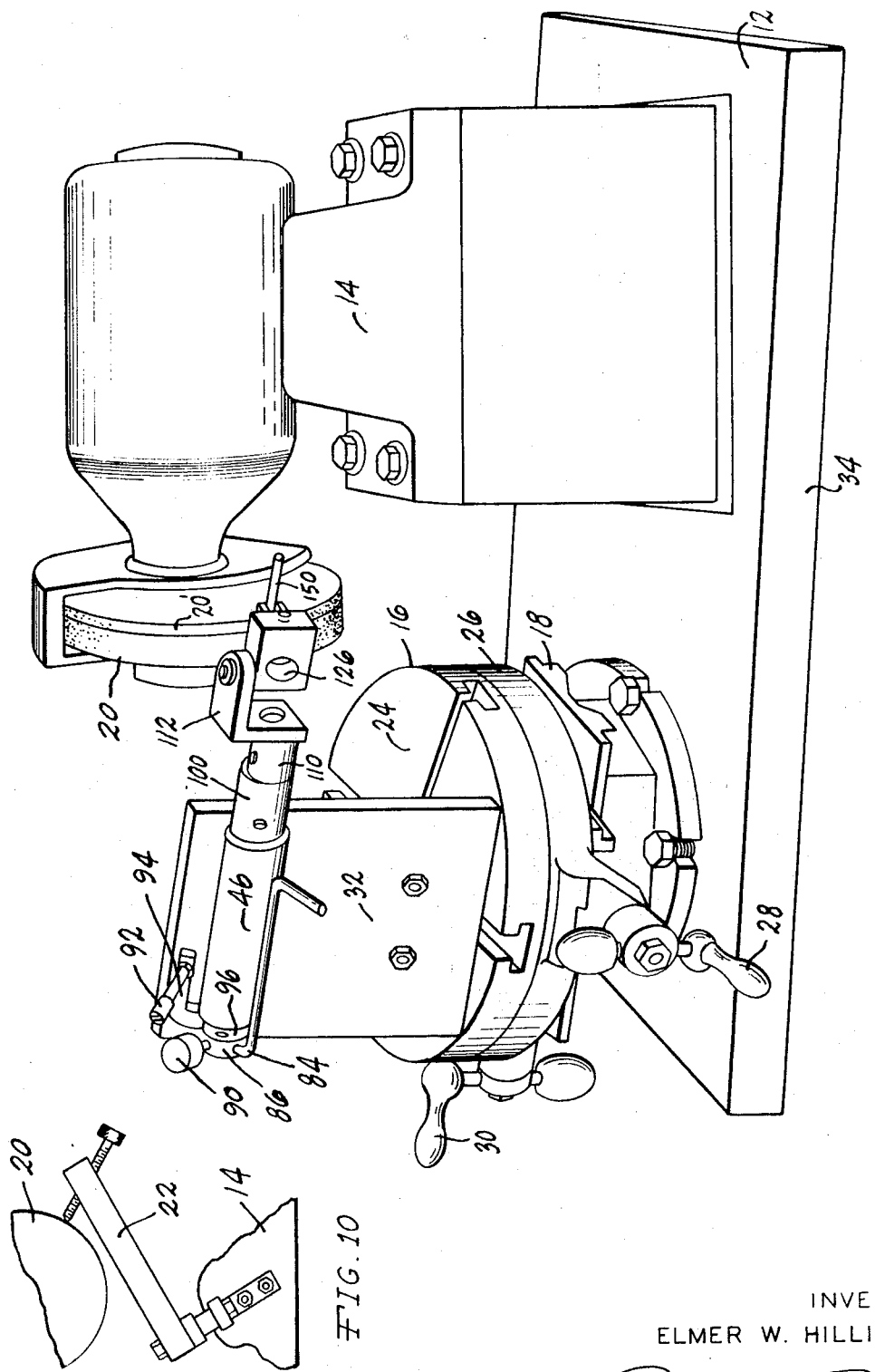
FIG. 1 is a perspective view of the grinding machine embodying the present invention, the wheel dresser being omitted from the showing for clarity.
Figure 2:
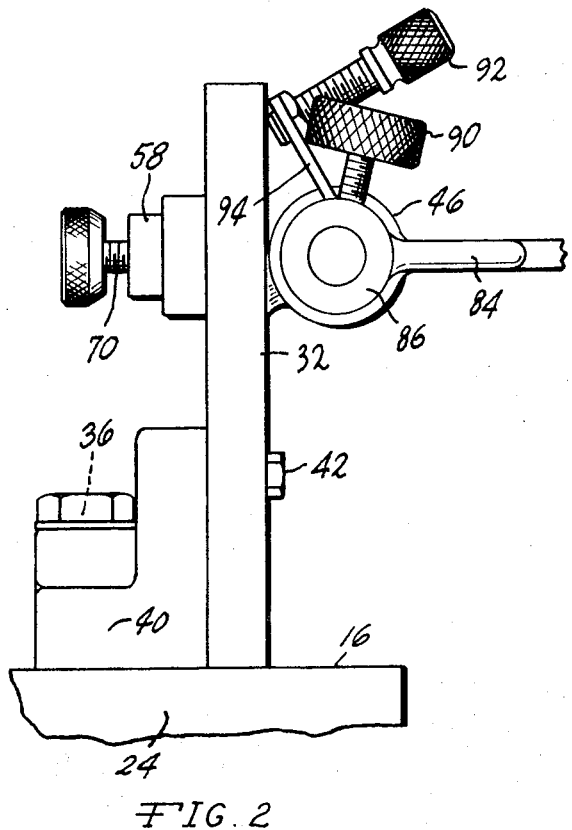
FIG. 2 is a fragmentary elevation of FIG. 1 taken from the left end thereof.
Figure 4:
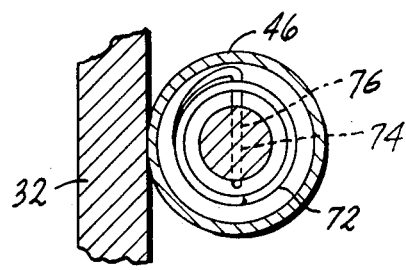
FIG. 4 is a cross-sectional view taken on line IV–IV of FIG. 3.

Referring to the drawings, in Fig. 1 the invention is illustrated in the form of a bench top tool grinding machine 10 having a rigid rectangular base 12 upon which is rigidly mounted a toolroom type grinder 14 and a rotary table 16. Preferably, ways for the lower carriage 18 of the table 16 are disposed with their longitudinal axes parallel to the axis of rotation of the grinding wheel 20. Thus, when the wheel 20 is dressed by the wheel dresser 22 to provide the wheel 20 with a substantially cylindrical outer peripheral surface for tool grinding thereon, any surface carried on the turret 24 of the upper carriage 26 will move along the axis of rotation of the wheel 20 when the lower carriage 18 is moved by rotation of the handle 28 attached to a lead screw, in a well known manner. Likewise, through rotation of the handle 30, the upper carriage 26 is moved normal to the axis of rotation of the wheel 20.

For reasons which will hereinafter appear, the mounting plate 32 is shown substantially parallel with the front edge 34 of the rectangular base 12. When so arranged the turret 24 is rotated through an angle in the order of 11°–15° to the longitudinal axis of the ways for the upper carriage 26 and the longitudinal axis for the ways for the lower carriage 18 are disposed at an angle in the order of 11°–15° to the front edge 34 of the base 12.

Mounting plate 32 is shown rigidly attached to the turret 24 through T-bolts 36 disposed in the T-slots 38 clamping the L-bracket 40. Bolts 42 removably attach the plate 32 to the L-bracket 40.

Bearing structure for the rock shaft carrying the tool holder 44 takes the form in the illustrated embodiment of a tube 46 having counterbores 48 and 50 at opposite ends. Rock shaft 52 has a close fit at opposite ends with the identical ball bearing structures 54. However, the counterbore 50 is of slightly elongated shape when compared with the counterbore 48 with the result that a small amount of clearance exists in one direction between the outer bearing race 56 and the counterbore 50.

Figure 5:
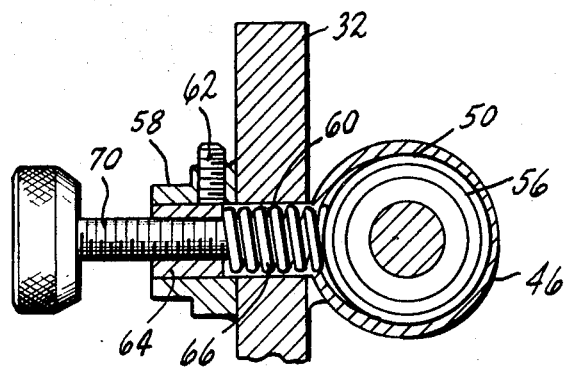
FIG. 5 is a cross-sectional view taken on line V–V of FIG. 3, FIGS. 6 and 7 are views taken at 90° to each other of the drill holder and stop finger assembly shown removed from the grinding machine.

As shown in Fig. 5, the tube 46 is rigidly attached to the plate 32 by welding. A boss 58, extending from one face of the plate 32, has a hole 60 machined therein which hole extends through the plate 32 as well as the wall of the counterbore 50, the longitudinal axis of the hole 60 coinciding with the elongated axis of the counterbore 50 which provides the clearance with the outer bearing race 56 above described. Set screw 62 holds a threaded bushing 64 in the hole 60. A compression spring is disposed between the bushing 64 and the outer bearing race 56 to continuously urge the outer race 56 toward the abutment 68 provided by that portion of the counterbore 50 opposite the hole 60. To rigidly clamp the outer bearing race 56 within the counterbore 50, when desired, a clamping screw 70, having a knurled head, is threaded in the bushing 64 and may be projected by rotation through the center opening of the spring 66 into engagement with the outer bearing race 56. Adjustment of the pressure exerted by the spring 66 may be made by regulating the position of the bushing 64 within the hole 60 through manipulation of the set screw 62.

Rock shaft 52 is embraced by torsion spring 72 having one end 74 extended through a cross hole 76 and the opposite end 78 anchored in hole 80 of the tube 46.

Figure 3:
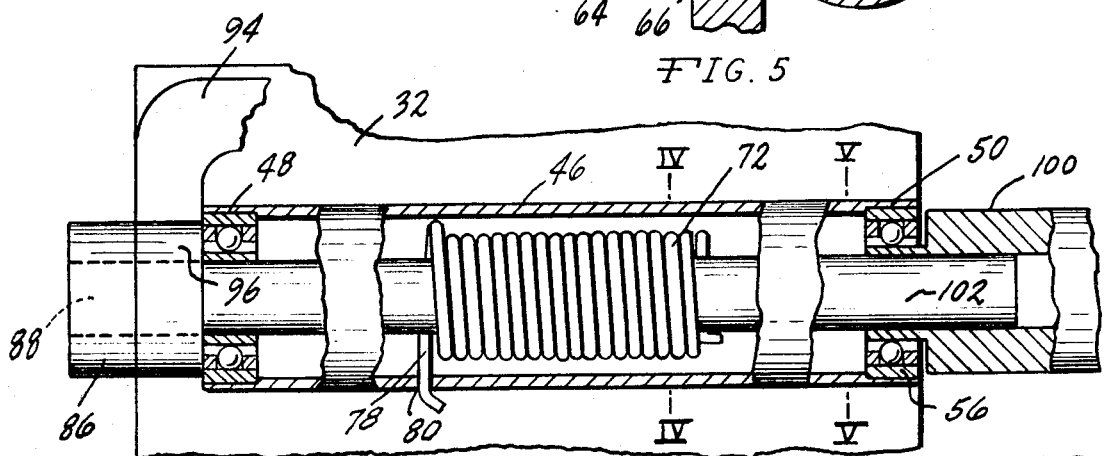
FIG. 3 is a fragmentary elevational view of a detail of FIG. 1 partly shown in vertical cross section and partly disassembled.

As shown in Figs. 1 and 3, a rock lever 82 for oscillating the tool being ground relative to the grinding wheel 20, has its end 84 fixed in the collar 86 adjustably attached to the left end 88 of the shaft 52 by the clamping screw 90. Attached to the same end of the shaft 52 is an adjustable stop screw 92 threaded in the arm portion 94 of the collar 96. A set screw 98 is provided to hold the collar 96 in different positions of adjustment on the shaft 52.

A coupling 100 is attached to the end 102 of the rock shaft 52 by set screw 104. An eccentric stub shaft 106 on the outer end of the coupling 100 is received in the bore 108 of the boss 110 on the L-bracket 112 of the tool holder structure. A set screw 114 rigidly holds the L-bracket 112 in different positions of angular adjustment on the shaft 106.

Swivel block 116 has a threaded boss 118 which projects from the upper side thereof through a hole 120 in the L-bracket 112. A friction nut 122 in combination with a friction washer 124 functions to frictionally hold the block 116 in different positions of adjustment, the resistance to movement of the block 116 relative to the L-bracket 120 being regulated by the tightening of the nut 122. Bore 126 is provided in block 116 to receive different size drill bushings. By providing a threaded hole 128 in the boss 118 extending into the bore 126, drill bushings may be conveniently held and removed through manipulation of the set screw 130.

Stop finger 132 of the tool holder structure comprises a block portion 134 from which projects a rigid stem 136 received in the bore 138 of the block 116 and held in different positions of adjustment by the set screw 140 disposed in a threaded cross hole 142. As more clearly shown in Fig. 9, the stop finger 132 has an L-shaped abutment and index portion 144 on the outer end of a threaded shank 146. To provide the portion 140 with micrometer adjustment, the shank 148 is threaded into a knurled handle 150 which is provided with a flange 152 disposed in cross slots 154 which permit the handle 150 to be rotated yet confined against axial movement relative to the block portion 134. The portion 144 is slidable back and forth in a complementary bore 156 in the block portion 134 through rotation of the handle 150.

SETUP FOR GRINDING DRILLS

In practice it will be understood that it is contemplated that the operator will sit or stand before the edge 34 of the base 12 of the machine 10 with the tool holder structure being located at a height at which the operator may comfortably insert and index the drill to be sharpened, the location of the axis of rotation of the wheel 20 being disposed at an angle to the edge 34 in the order of 11°–15° contributing to such comfort, particularly when the machine is being used to split drill points.

To setup or place the machine "on center" for the purpose of rapidly repointing a large number of similar size drills, for example, the following steps are taken with the rock shaft 52 in its at rest position under the stress of the torsion spring 72 and the outer bearing race 56 being held against the abutment 68 defined by a portion of the counterbore 50 by either the spring 66 or the clamping screw 70:

a. Coupling 100 is adjusted on the end 102 of the rock shaft 52 by loosening and then tightening the set screw 104 to substantially dispose the eccentric stub shaft 106 with its longitudinal axis in a horizontal plane through the common longitudinal axis of the coupling 100 and the rock shaft 52 and on the side of said common axis remote from the wheel 20, the axis of rotation of which is slightly disposed above this same plane. When the shaft 106 is so located, the flutes of the drill will be ground at the tip of the drill as arcuate surfaces by passing the tool through the wheel as distinguished from plunge grinding, the latter being of a nature which would provide the flutes with a substantially flat ground surface. Should such a ground surface be desired it may be substantially obtained by the illustrated machine by adjusting the coupling 100 on the rock shaft 52 to dispose the shaft 106 at 90° to the position described above for arcuate grinding.

b. With the shaft 106 located in the horizontal plane defined in (a) the L-bracket 112 is adjusted on the shaft 106 by loosening and tightening the set screw 114 to dispose the longitudinal axis of the threaded boss 118 in a substantially vertical position.

c. With the wheel 20 dressed to present a substantially cylindrical peripheral grinding surface, the block 116 is manually moved about the axis of the threaded boss 118 to dispose the longitudinal axis of the bore 126 at the necessary angle to the grinding surface of the wheel 20 to provide drills with points of the desired angle, the block 116 being frictionally held in the selected position.

d. The selected bushing having a bore substantially corresponding to the size of the drill to be repointed is then inserted into the bore 126 and the set screw 130 tightened to hold the bushing in place. With the drill bushing in place, the stop finger 132 can then be adjusted to the drill size being repointed by using one of such drills for the setup and manipulating the handle 150 to place the L-shaped outer end 144 in a position to function as both a stop and as a rest for a flute at one end of the drill while exposing another flute of the drill to the grinding operation.

e. With the setup drill lightly held by hand by the shank and with the point of the drill resting on the end 144 of the stop finger 132, the operator applies a slight axial pressure on the shank as well as a light torsional pressure clockwise to hold the drill against the end 144 in an index position determined by the engagement of one of the cutting edges of the drill with a surface of the end 144. With the drill thus manually positioned and held by the operator's right hand, the handles 28 and 30, on the rotary table 16, are manipulated to so position the stop finger 132 with respect to the wheel 20, that when the rock shaft 52 is oscillated by the rock shaft lever 82, the exposed flute of the drill on the end 144 will lightly brush the grinding surface of the wheel 20. The machine is now "on center" and setup for high-production hand grinding of drills.

With the tool holder "on center," as described above, and the clamping screw 70 backed off so that modest manual axial pressure on the tool shank will cause the outer bearing race 56 to be displaced feel" the abutment portion 68 of the elongated counterbore 50, oscillation of the rock shaft 52 by the left hand of the operator through the rock lever 82 will result in a substantial removal of material from the drill flute engaging the end 144 and exposed to the grinding wheel 20. Preferably, upon the completion of each oscillation of the rock shaft 52, the operator will index the drill clockwise to successively grind the flutes of the drill to be repointed, the amount of axial pressure on the shank determining the amount of material removed and the amount of material being removed during each oscillation being proportional to the distance the outer bearing race 56 is removed from the abutment portion 68 against the tension of the spring 66.

In practice, the elongation of the bore 50 exceeds the diameter of the outer bearing race 56 on the order of 0.030 inches. As may be readily understood, the tension of the spring 66 provides the "feel" experienced by the operator during the grinding operation, with the shank of the drill being held in his hand and a modest amount of pressure being applied axially to the shank.

In order to grind the flutes of the drill with equal height at the point, it is not necessary that the operator uniformly remove material each time the drill is oscillated and indexed on the end 144 of the stop finger 132. When the operator observes that all nicks and other defects have been removed from the ground flutes of the drill, he need only, thereafter, reduce the axial pressure on the drill shank to enable the spring 66 to bring the tool holder structure and drill point supported thereon back to the "on center" position by continuously indexing and oscillating the drill to permit the drill to "-spark out" on the grinding wheel 20. This "on center" grinding position during which any excess material on one flute, as compared with another, will equalize the height of the ground flutes and center the drill point with great accuracy notwithstanding the hand holding and indexing of the drill.

It should be appreciated that the length of the drill being ground does not complicate either the setup described above or the high production grinding of a batch of drills of varying overall length.

To regulate the amount of clearance or relief of the cutting edge of the drill, the boss 110 may be slightly rotated on the stub shaft 106. Rotation in one direction increases the clearance and in the opposite direction reduces the clearance, even to the point of negative clearance, if desired.

One of the inherent features of the illustrated tool holder resides in the fact that rotation of the block 116 in a direction to increase the point angle also increases the cutting edge clearance without any other adjustment being made.

In order to alter the chisel edge angle of the drills being repointed, it is only necessary to slightly raise or lower the end 144 of the stop finger 132 by loosening the set screw 140 to enable the end 144 to be rotated about the longitudinal axis of the stem 136. This enables the indexed position of the drill on the end 144 to be slightly altered.

DRILL SPLITTING

Resetting the machine 10 from drill grinding, described above, to drill splitting is facilitated by having the grinding wheel 20 provided with a splitting section indicated at 20' disposed at one radial face thereof. Section 20' is of a composition capable of being dressed to a sharp corner and retaining the same without dressing for the splitting of many drills. The resetting steps follow:

a. The clamping screw 70 is run in to project its end into contact with the outer bearing race 56 to rigidly hold the same in contact with the abutment portion 68 of the elongated bore 50.

b. Set screw 114 is loosened to permit the boss 110 to be rotated on the shaft 106 from the position used in drill grinding to a position removed therefrom in the order of 45° in a direction to raise the end 144.

c. With the setup drill resting in an index position on the end 144, the end 144 is lowered by rotating the same about the stem 136 until the indexed position disposes the chisel edge of the drill substantially normal to the axis of the rock shaft 52.

d. With the drill on the end 144 and positioned in front of the outer edge of the wheel section 20', the drill may now be fed into the wheel section 20' through manipulation of the carriages of the rotary table necessary to obtain the desired degree of point splitting, the position of adjustment of the pointed end of the drill being ultimately under the control of the stop 92. The setup for splitting is now complete and the drill ends to be split are supported and indexed on the end 144 of the finger stop 132.

I claim:

1. A grinding machine for the hand grinding of tools such as drills comprising a grinding element, a holder in which a tool is manually supported, said holder including a stop against which a portion of the working end of the tool abuts to resist pressure manually exerted on the shank of the tool, support structure for said holder for substantially defining the manually effected path of movement of said stop relative to said grinding element to present another portion of the working end of the tool to said element, and yieldable means associated with said stop and subjected to manual axial pressure exerted on the tool shank for slightly modifying the path of movement of said stop relative to said grinding element.

2. A machine as defined in claim 1 wherein said support structure includes a rock shaft about the longitudinal axis of which said holder is manually oscillated to bring the tool into engagement with the grinding element.

3. A machine as defined in claim 2 wherein rigid structure is provided for the relative positioning of said grinding element and said rock shaft, said yieldable means being disposed between said rock shaft and said rigid structure.

4. A machine as defined in claim 3, there being means on said rigid structure for rendering said yieldable means inoperative.

5. A machine as defined in claim 4, wherein said rigid structure includes adjustable means for moving said holder relative to said grinding element and along the path parallel to the axis of rotation of said element.

6. A grinding machine as defined in claim 1 wherein said yieldable means includes a spring element, a rigid abutment associated with said support structure, said spring element engaging said support structure and continuously acting to urge said support structure against said abutment.

7. A machine as defined in claim 1 wherein means are provided for adjusting the degree of yieldability of said yieldable means.

8. A machine as defined in claim 1 wherein there are means for supporting said holder for movement about one axis for oscillating said stop relative to said grinding wheel to grind the lips of the tool with arcuate surfaces, and means for supporting said holder for swivel adjustment about an axis disposed normal to said first axis to change the point angle.

* * * * *